(12) United States Patent
Epstein et al.

(10) Patent No.: US 9,318,128 B1
(45) Date of Patent: Apr. 19, 2016

(54) METHODS AND SYSTEMS FOR DETERMINING INSTRUCTIONS FOR APPLICATIONS THAT ARE RECOGNIZABLE BY A VOICE INTERFACE

(71) Applicants: Mark Edward Epstein, New York, NY (US); Pedro J. Moreno Mengibar, Jersey City, NJ (US); Fadi Biadsy, Brooklyn, NY (US)

(72) Inventors: Mark Edward Epstein, New York, NY (US); Pedro J. Moreno Mengibar, Jersey City, NJ (US); Fadi Biadsy, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 13/757,257

(22) Filed: Feb. 1, 2013

Related U.S. Application Data

(60) Provisional application No. 61/750,197, filed on Jan. 8, 2013.

(51) Int. Cl.
*G10L 21/10* (2013.01)

(52) U.S. Cl.
CPC ...................................... *G10L 21/10* (2013.01)

(58) Field of Classification Search
None
See application file for complete search history.

(56) References Cited

U.S. PATENT DOCUMENTS

| | | | | |
|---|---|---|---|---|
| 5,864,808 A | * | 1/1999 | Ando | G06K 9/033 704/211 |
| 6,192,343 B1 | * | 2/2001 | Morgan | G06F 9/4446 704/231 |
| 6,735,560 B1 | * | 5/2004 | Epstein | G06F 17/2775 704/9 |
| 6,963,831 B1 | * | 11/2005 | Epstein | G06F 17/2715 704/270 |
| 6,999,930 B1 | * | 2/2006 | Roberts | G10L 15/193 379/88.01 |
| 7,720,683 B1 | * | 5/2010 | Vermeulen | G10L 15/22 704/235 |
| 7,769,591 B2 | | 8/2010 | White | |
| 7,949,536 B2 | * | 5/2011 | Mowatt | G10L 15/193 704/254 |
| 8,024,196 B1 | | 9/2011 | Wodtke | |
| 8,473,300 B1 | * | 6/2013 | Moreno Mengibar | G10L 15/19 704/244 |
| 8,484,025 B1 | * | 7/2013 | Moreno Mengibar | G10L 15/063 704/10 |
| 8,612,226 B1 | * | 12/2013 | Epstein | G06Q 30/0241 704/251 |

(Continued)

*Primary Examiner* — Tammy Pham
*Assistant Examiner* — Walter Yehl
(74) *Attorney, Agent, or Firm* — McDonnell Boehnen Hulbert & Berghoff LLP

(57) ABSTRACT

Methods and systems for facilitating development of voice-enabled applications are provided. The method may comprise receiving, at a computing device, a plurality of actions associated with a given application, parameters associated with each respective action, and example instructions responsive to respective actions. The method may also comprise determining candidate instructions based on the actions, parameters, and example instructions. Each candidate instruction may comprise one or more grammars recognizable by a voice interface for the given application. The method may further comprise the computing device receiving respective acceptance information for each candidate instruction, and comparing at least a portion of the respective acceptance information with a stored acceptance information log comprising predetermined acceptance information so as to determine a correlation. Still further, the method may comprise determining a set of instructions comprising one or more of the candidate instructions based on the determined correlation.

20 Claims, 9 Drawing Sheets

| ACCEPT | REJECT | RANK | CONFIDENCE SCORE (0-100) | Candidate Instruction |
|---|---|---|---|---|
| ✓ | | 2 | 85 | "Can I have a reservation for [number] diners at [time]?" |
| ✓ | | 1 | 98 | "Make dinner reservation, party of [number], at [time]." |
| | ✓ | 4 | 10 | "Reserve [number] for [time]." |
| | | 3 | 50 | "Book seating for [number] at [time]." |
| . | . | . | . | . |
| . | . | . | . | . |
| . | . | . | . | . |

800

(56) References Cited

U.S. PATENT DOCUMENTS

| | | | |
|---|---|---|---|
| 2003/0125945 A1* | 7/2003 | Doyle | G10L 15/01 704/246 |
| 2004/0181392 A1* | 9/2004 | Parikh | G06F 17/30011 704/10 |
| 2006/0101014 A1* | 5/2006 | Forman | G06F 17/277 |
| 2006/0203980 A1* | 9/2006 | Starkie | G06F 8/30 379/88.18 |
| 2006/0212841 A1* | 9/2006 | Sinai | G06F 8/38 717/105 |
| 2007/0106497 A1* | 5/2007 | Ramsey | G06F 17/278 704/9 |
| 2007/0185702 A1* | 8/2007 | Harney | G06F 17/271 704/4 |
| 2007/0276664 A1* | 11/2007 | Khosla | G10L 15/193 704/257 |
| 2007/0294710 A1 | 12/2007 | Meesseman | |
| 2009/0323675 A1 | 12/2009 | Raza | |
| 2010/0036661 A1* | 2/2010 | Boucher | G10L 15/19 704/235 |
| 2010/0106497 A1* | 4/2010 | Phillips | G10L 15/30 704/231 |
| 2013/0103404 A1* | 4/2013 | Burke | G06F 3/167 704/275 |
| 2013/0246920 A1* | 9/2013 | Fields | G06F 3/167 715/728 |
| 2014/0067392 A1* | 3/2014 | Burke | G10L 15/22 704/236 |
| 2015/0023484 A1* | 1/2015 | Ni | H04M 3/5183 379/88.18 |

* cited by examiner

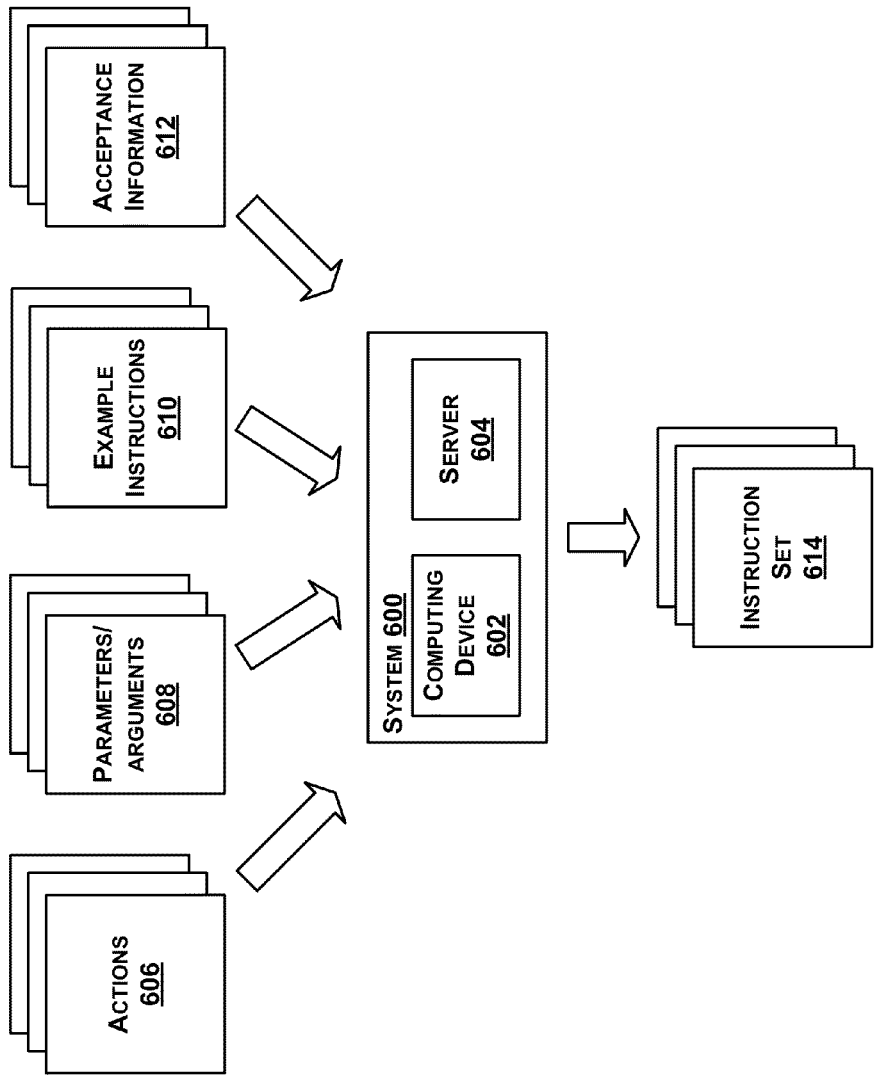

| ACCEPT | REJECT | RANK | CONFIDENCE SCORE (0-100) | Candidate Instruction |
|---|---|---|---|---|
| ✓ | | 2 | 85 | "Can I have a reservation for [number] diners at [time]?" |
| ✓ | | 1 | 98 | "Make dinner reservation, party of [number], at [time]." |
| | ✓ | 4 | 10 | "Reserve [number] for [time]." |
| | | 3 | 50 | "Book seating for [number] at [time]." |
| . . . | . . . | . . . | . . . | . . . |

METHODS AND SYSTEMS FOR DETERMINING INSTRUCTIONS FOR APPLICATIONS THAT ARE RECOGNIZABLE BY A VOICE INTERFACE

CROSS-REFERENCE TO RELATED APPLICATION

The present disclosure claims priority to U.S. Provisional Application No. 61/750,197, filed on Jan. 8, 2013, the entire contents of which are herein incorporated by reference.

BACKGROUND

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is a "voice-user-interface" (VUI) (e.g., "voice control"), which may allow a user to provide speech data to the computing system in order to recognize verbal inputs. The data may be received, translated into text, and processed by a speech recognition system, and may ultimately be used by the computing system as a basis for executing certain computing functions. Speech recognition systems use syntax- and semantics-based mechanisms such as word patterns and grammars to recognize or otherwise predict the meaning of a verbal input (e.g., what patterns of words to expect a human to say) and, in some cases, to formulate a response to the verbal input, that may take a form of one or more computing functions.

As speech recognition systems have become more reliable, it is becoming more prevalent to integrate VUIs with applications developed for computing systems such as mobile devices. However, it can be difficult for application developers wanting to provide speech recognition services to their users to create and maintain an effective speech recognition system without consuming excessive resources and requiring sufficient experience with speech technologies.

SUMMARY

In one aspect, a method is described. The method may comprise receiving, at a computing device, information indicating a plurality of actions associated with a given application, and each respective action of the plurality of actions includes one or more parameters associated with the respective action. The method may also comprise receiving one or more example instructions responsive to respective actions, and the one or more example instructions comprise natural language. The method may further comprise based on the one or more example instructions, the plurality of actions, and the one or more parameters associated with each respective action, determining a plurality of candidate instructions for each respective action, and each candidate instruction of the plurality of candidate instructions comprises one or more grammars recognizable by a voice interface for the given application. Still further, the method may comprise receiving, at the computing device, a plurality of acceptance information, and the plurality of acceptance information comprises respective acceptance information for each candidate instruction, and the plurality of acceptance information is indicative of whether one or more of the plurality of candidate instructions are applicable to the respective action.

Yet still further, the method may comprise comparing at least a portion of the respective acceptance information with a stored acceptance information log so as to determine a correlation between the respective acceptance information and the stored acceptance information log, and the stored acceptance information log comprises a plurality of predetermined acceptance information associated with a plurality of predetermined example instructions. Yet still further, the method may comprise based on the correlation, the computing device determining a set of instructions responsive to one or more of the plurality of actions that are recognizable by the voice interface, and the set of instructions includes one or more of the plurality of candidate instructions.

In another aspect, a computer readable storage medium having stored therein instructions executable by a computing device to cause the computing device to perform functions is described. The functions may comprise receiving information indicating a plurality of actions associated with a given application, and each respective action of the plurality of actions includes one or more parameters associated with the respective action. The functions may also comprise receiving one or more example instructions responsive to respective actions, and the one or more example instructions comprise natural language. The functions may further comprise based on the one or more example instructions, the plurality of actions, and the one or more parameters associated with each respective action, determining a plurality of candidate instructions for each respective action, and each candidate instruction of the plurality of candidate instructions comprises one or more grammars recognizable by a voice interface for the given application. Still further, the functions may comprise receiving a plurality of acceptance information, and the plurality of acceptance information comprises respective acceptance information for each candidate instruction, and the plurality of acceptance information is indicative of whether one or more of the plurality of candidate instructions are applicable to the respective action.

Yet still further, the functions may comprise comparing at least a portion of the respective acceptance information with a stored acceptance information log so as to determine a correlation between the respective acceptance information and the stored acceptance information log, and the stored acceptance information log comprises a plurality of predetermined acceptance information associated with a plurality of predetermined example instructions. Yet still further, the functions may comprise based on the correlation, determining a set of instructions responsive to one or more of the plurality of actions that are recognizable by the voice interface, and the set of instructions includes one or more of the plurality of candidate instructions.

In yet another aspect, a system is described. The system may comprise at least one processor. The system may also comprise data storage comprising program instructions executable by the at least one processor for performing functions. The functions may comprise receiving information indicating a plurality of actions associated with a given application, and each respective action of the plurality of actions includes one or more parameters associated with the respective action. The functions may also comprise receiving one or more example instructions responsive to respective actions, and the one or more example instructions comprise natural language. The functions may further comprise based on the one or more example instructions, the plurality of actions, and the one or more parameters associated with each respective action, determining a plurality of candidate instructions for each respective action, and each candidate instruction of the plurality of candidate instructions comprises one or more grammars recognizable by a voice interface for the given application. Still further, the functions may comprise receiving a plurality of acceptance information, and the plurality of acceptance information comprises respective acceptance information for each candidate instruction, and the plurality of acceptance information is indicative of whether one or more of the plurality of candidate instructions are applicable to the respective action.

Yet still further, the functions may comprise comparing at least a portion of the respective acceptance information with a stored acceptance information log so as to determine a correlation between the respective acceptance information and the stored acceptance information log, and the stored acceptance information log comprises a plurality of predetermined acceptance information associated with a plurality of predetermined example instructions. Yet still further, the functions may comprise based on the correlation, determining a set of instructions responsive to one or more of the plurality of actions that are recognizable by the voice interface, and the set of instructions includes one or more of the plurality of candidate instructions.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6 illustrates an example system, as well as inputs and outputs to the example system, in accordance with an example method.

FIG. 8 illustrates an example computing device performing functions in accordance with an example method.

DETAILED DESCRIPTION

Figure 1:
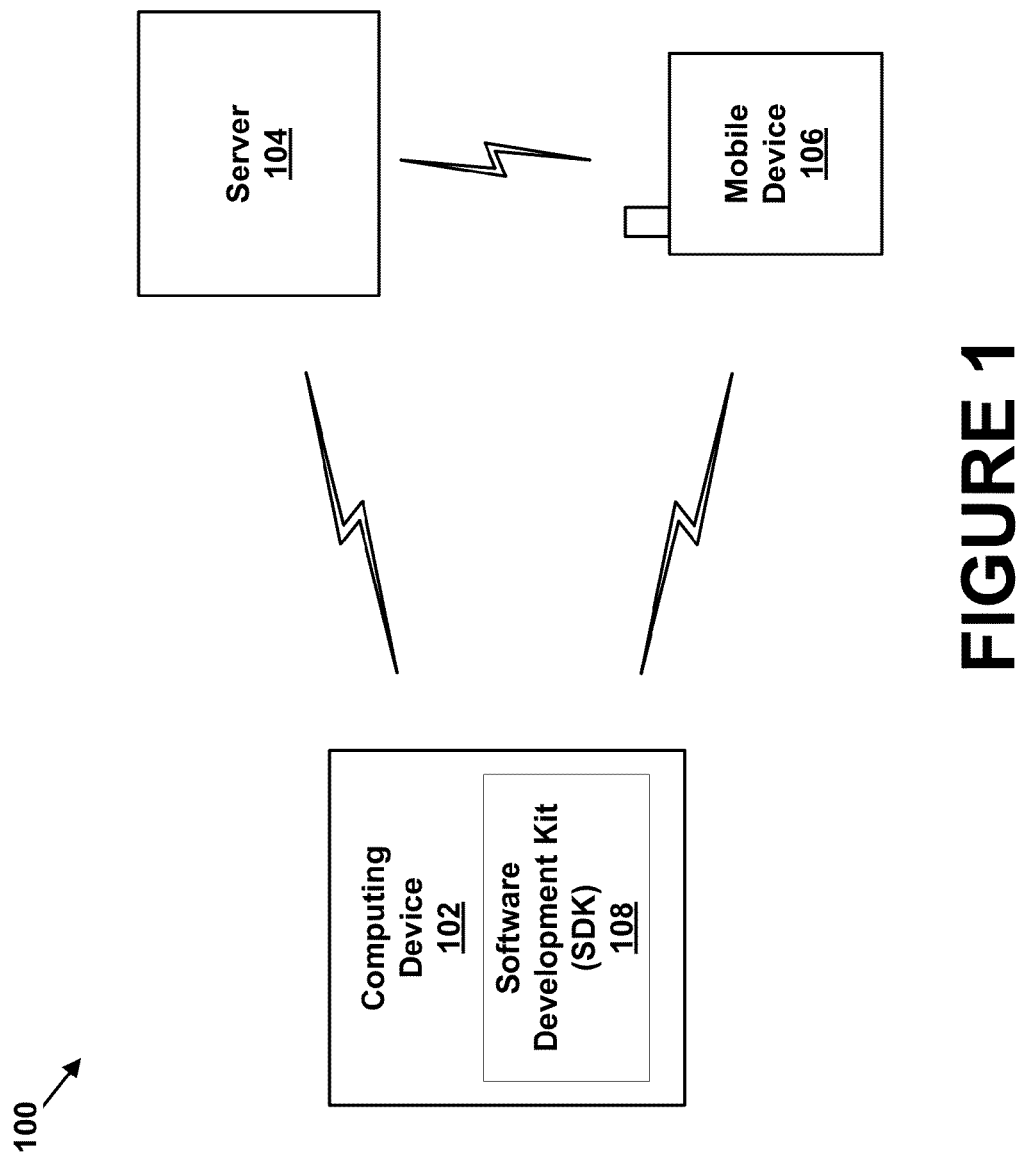
FIG. 1 illustrates an example communication system in which an example method may be implemented.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description may disclose, inter alia, systems and methods for bootstrapping to facilitate development of voice-enabled applications on a computing device. Such a computing device may include a mobile computing device, such as a smartphone, tablet computer, laptop, and the like. Further, such a computing device may include a desktop computer configured to run a voice-enabled application within a software application (e.g., an internet browser). Still further, such a computing device may include a wearable device, such as a watch, glasses, and the like, or an appliance, such as a television, configured to receive a voice command (e.g., via a microphone coupled to the device/appliance) and run a voice-enabled application.

While "computing devices" and "mobile devices" are referred to and described herein as examples, it should be understood that the systems and methods described herein may also be implemented with various types of computing devices including, but not limited to, the aforementioned computing devices. For example, the functions performed by a "computing device" as described herein, may be performed, additionally or alternatively, by a mobile computing device, wearable computing device, computing appliance, etc. Further, the functions performed by a "mobile device" as described herein, may be performed, additionally or alternatively, by a desktop computer, smartphone, wearable computing device, computing appliance, or other computing devices, both mobile devices and non-mobile devices.

In one aspect, a system comprising a computing device, server, and mobile device may be configured to perform the methods described herein. The computing device may be configured to operate in accordance with the server entity in order to determine an instruction set comprising natural language recognizable by a VUI. In some examples, the computing device may be a desktop computer, smartphone, or wearable computing device. In other examples, the computing device may be a household appliance, such as a television, coupled with a microphone and/or another computing device and configured to receive a voice command. Similarly, the mobile device may be a desktop computer, smartphone, wearable computing device, etc. Other examples are also possible.

The instruction set, combined with the VUI, may then be integrated with an application developed for the mobile device. In some aspects, information provided by one or more users of the mobile device may be stored, processed, and/or sent to the computing device and server to further facilitate the determination of an instruction set for one or more applications, including applications in development stage and previously-developed applications that are lacking voice control functionality. In utilizing a voice-enabled application (e.g., an application and the VUI), a verbal input may be provided by a user of the mobile device to be parsed so as to recognize one or more words. The mobile device may then identify one or more functions to perform associated with the recognized words, and execute the one or more functions that the application is configured to perform.

In another aspect, the computing device may include a software development kit (SDK) configured to modify a given application to include the VUI based on inputs received by the computing device. Prior to building a VUI, a given application may be configured to perform one or more functions, and such inputs received by the computing device may be representative of the one or more functions. For example, the computing device may receive a plurality of actions indicative of functions that may be performed by the given application (e.g., actions for a restaurant-based application may include booking and cancelling a reservation), and the plurality of actions may include one or more parameters that further define the actions (e.g., parameters for booking a reservation may include location, time, etc.). In some aspects, the actions and parameters may be provided to the computing device by a user, such as an application developer.

The computing device may also receive one or more example instructions from the developer. Since a VUI receives voice commands from a user so as to perform certain functions, the example instructions provided to the computing device may be representative of example commands. The computing device may then generate one or more candidate instructions for each respective action based on the actions, parameters, and example instructions provided by the developer. In some aspects, the computing device may communicate with another computing entity, such as a server, in order to build candidate instructions further based on similar instructions generated for previously created application-and-VUI combinations. For example, in order to generate candidate instructions for a map/navigation application, the computing device may search for instructions that had been generated for other map applications developed by the same developer or other developers.

After determining the candidate instructions, the computing device may receive a plurality of acceptance information from the developer. The acceptance information may be indicative of whether each respective candidate instruction is applicable to the respective action that it is associated with. Such applicability may be determined by the developer in some examples, or by one or more computing devices in other examples. Further, the acceptance information may then be compared with a stored acceptance information log (e.g., stored at a server or other computing device) in order to determine a final set of instructions for the VUI of the given application. The stored acceptance information log may comprise predetermined acceptance information associated with predetermined example instructions.

Systems, methods, and devices in which example embodiments may be implemented will now be described in greater detail. In general, described methods may be implemented by a computing device. However, the described methods may also be implemented by other devices, such as a personal computer, mobile device, or wearable computing device, among others. Further, an example system may take the form of computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

FIG. 1 illustrates an example communication system 100 in which an example method may be implemented. In FIG. 1, a computing device 102 may communicate with a server 104 via one or more wired and/or wireless interfaces. Further, the computing device 102 and the server 104 may communicate with a mobile device 106 via one or more wired and/or wireless interfaces. The computing device 102, server 104, and mobile device 106 may all communicate with each other within a network. Alternatively, the computing device 102, server 104, and mobile device 106 may each reside within a respective network.

The computing device 102 may be any type of computing device or plurality of computing devices, such as a personal computer or a laptop that is configured to transmit data to or receive data from the server 104 and/or mobile device 106 in accordance with methods and functions described herein. Further, the computing device 102 may be configured to transmit data to and/or receive data from a user of the computing device 102, such as a developer. The computing device 102 may include a user interface, a communication interface, a processor, and data storage comprising instructions executable by the processor for carrying out one or more functions relating to the data sent to, or received by, the other entities in the system 100. The user interface may include buttons, a touchscreen, a microphone, and/or any other elements for receiving inputs, as well as a speaker, one or more displays, and/or any other elements for communicating outputs. The computing device 102 may also include an SDK 108 that may be utilized by a developer to create voice-enabled applications. Further, the SDK 108 may be configured to process received inputs in order to determine one or more desired outputs.

The server 104 may be any entity arranged to operate in accordance with the computing device 102 and/or mobile device 106 so as to carry out the method and computing device functions described herein. Further, the server 104 may be configured to send data to or receive data from the computing device 102 and/or the mobile device 106. The server 104 may include a speech recognition module (or, in some embodiments, a text recognition module) which may be configured to process data received from the computing device 102 and/or the mobile device 106. In some examples, however, speech or text recognition may be performed by a separate entity, or by the computing device 102 or mobile device 106. The server 104 may further include stored data, such as acceptance information logs, that may be sent to the computing device 102 upon a request made by the computing device 102 for such information. Alternatively, acceptance information logs and other such data may be stored locally at the computing device 102 rather than stored remotely at the server 104 or other entity.

The mobile device 106 may be any type of computing device, including a laptop computer, a mobile telephone, tablet computing device, etc., that is configured to transmit data to or receive data from the computing device 102 and/or server 104 in accordance with the method and functions described herein. The mobile device 106 may include a user interface, a communication interface, a processor, and data storage comprising instructions executable by the processor for carrying out one or more functions relating to the data sent to, or received by, the computing device 102 and/or the server 104. The user interface may include buttons, a touchscreen, a microphone, and/or any other elements for receiving inputs, as well as a speaker, one or more displays, and/or any other elements for communicating outputs.

The data received by the computing device 102 may include actions, parameters, and example instructions associated with a given application, and the data may be provided by a user of the computing device 102 or by another computing device. The data may also include user-provided acceptance information associated with the actions, predetermined acceptance information (e.g., stored at the server 104), and/or information indicative of a correlation between the user-provided acceptance information and the predetermined acceptance information. Further, the server 104 may receive data from the computing device 102 and subsequently store the data locally. For example, the computing device 102 may receive example instructions and/or acceptance information from a developer and subsequently send them (or a copy) to the server 104 to be stored for future use.

Still further, data received by or transmitted from the mobile device 106 may include one or more of the types of data described herein. For example, after the computing device 102 has determined an instruction set for a VUI of a given application, the computing device 102 may send the instruction set to the mobile device 106 so as to update the given application. Alternatively, the given application may be modified at the computing device 102 to include the instruction set prior to being sent to the mobile device 106. Each instruction in the instruction set (and set of candidate instructions) may include a text string representative of one or more spoken utterances.

The data may take various forms. For example, candidate instructions provided by the server 104 to the computing device 102 may take the form of text, and the actions/parameters received by the computing device 102 may take the form of text as well. Alternatively, some data, such as candidate instructions, may take the form of an audio recording. Further, the server 104 may receive candidate instructions from the mobile device 106. More specifically, by interacting with a given voice-enabled application, an audio voice command (e.g., an instruction) provided by a user of the mobile device 106 may be received by the mobile device 106, converted to text, and parsed in order to identify one or more functions for the application to perform. A text or audio form of the provided instruction may be stored locally at the mobile device 106 or sent to the server 104 to be stored. Such stored instructions may then be used as candidate instructions sent to the computing device 102 to facilitate the development of a VUI of another application similar to the given application for which the initial voice command/instruction was intended. Other examples of data forms and interactions between entities of the system 100 are also possible.

Figure 2:
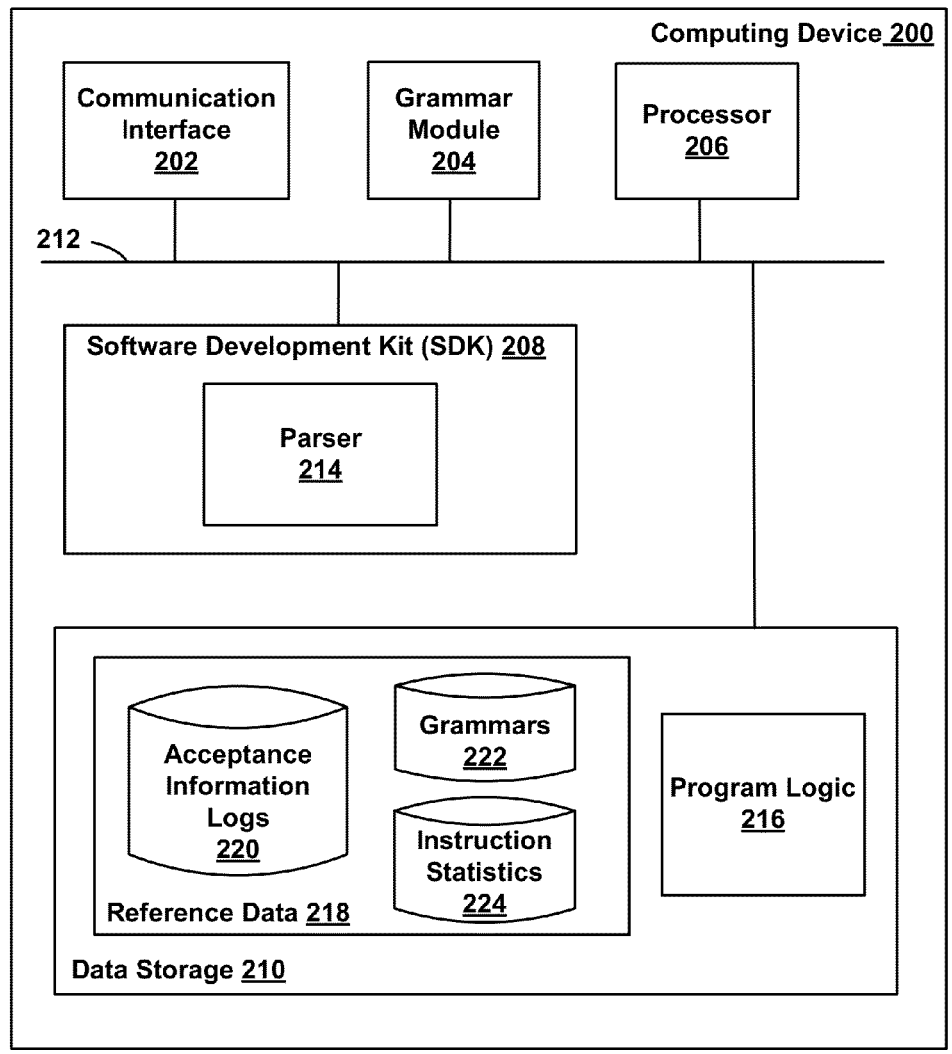
FIG. 2 illustrates a schematic drawing of an example computing device.

FIG. 2 illustrates a schematic drawing of an example computing device 200. In some embodiments, some components illustrated in FIG. 2 may be distributed across multiple computing devices. However, for the sake of example, the components are shown and described as part of one example computing device 200. The computing device 200 may be a personal computer, laptop computer, cloud, or similar entity that may be configured to perform the functions described herein.

The computing device 200 may include a communication interface 202, a grammar module 204, a processor 206, an SDK 208, and data storage 210. All of the components illustrated in FIG. 2 may be linked together by a communication link 212. The computing device 200 may also include hardware to enable communication within the computing device 200 and between the computing device 200 and another computing device (not shown). The hardware may include transmitters, receivers, and antennas, for example.

The communication interface 202 may allow the computing device 200 to communicate with another device (not shown), such as a mobile phone, server, etc. Thus, the communication interface 202 may be configured to receive input data from one or more computing devices, and may also be configured to send output data to the one or more computing devices. In some examples, the communication interface 202 may also maintain and manage records of data received and sent by the server 200. In other examples, records of data may be maintained and managed by other components of the server 200.

The grammar module 204 may be configured to produce and/or store grammars, although grammars may be produced and/or stored at or by a separate entity as well. A grammar may define a language and includes a syntax, semantics, rules, inflections, morphology, phonology, etc. Grammars may be used by the computing device 200 or another device that the computing device 200 communicates with in order to recognize verbal inputs (e.g., using word patterns, often referred to as a "grammar-based textual patterns"). Grammars may also be utilized by the computing device 200 in order to determine a set of instructions (e.g., and/or candidate instructions) for a VUI of a given application. In some examples, each instruction of the set of instructions for the VUI may be grammar-based, and in other examples, a set of instructions may include a combination of both grammar-based and non-grammar-based instructions. It is also possible that a system, such as the system 100 illustrated in FIG. 1, may not use any grammars in carrying out the method and associated functions described herein.

The SDK 208 may be configured to modify one or more given applications to include a VUI. The SDK 208 may also be configured to manage actions, parameters, example instructions, candidate instructions, and VUI instruction set. Further, the SDK 208 may locally store one or more applications that are in-development so as to integrate the applications with the determined VUI instruction set.

The SDK 208 may include a parser 214 configured to parse a given application and determine a plurality of actions, parameters, etc. An XML component of a given application may include XML-based definitions of actions as well as fields of information (e.g., parameters) that the given application is designed to receive. The parser 214 may create an XML markup of the given application and subsequently identify actions and associated fields/parameters of the given application. Further, by parsing the given application, the computing device 200 may determine one or more arguments (e.g., field values in the form of text strings) for each of the determined fields. In other words, as an example, the parser 214 may determine a CUISINE TYPE field for a restaurant application and associated values, such as "American," "French," and "barbeque," that may be applicable to the CUISINE TYPE field. In some examples, the parser 214 may use grammars provided by the grammar module 204 to determine the actions/fields/arguments of a given application. In other examples, the parser 214 may access data stored at a server entity so as to compare determined actions, parameters, and arguments with predetermined actions, parameters, and arguments stored at the server entity. In still other examples, the parser 214 may determine a set of example instructions based on the identified actions/fields/arguments, and may compare the set of example instructions with predetermined instructions stored at the server entity. Other examples are also possible.

The data storage 210 may store program logic 216 that can be accessed and executed by the processor 206. The data storage 210 may also store reference data 218 that may be used to produce/modify grammars, as well as manage information used to determine a VUI instruction set, such as acceptance information associated with candidate instructions. The computing device 200 may be configured to access the reference data 218 upon receiving an input from a user of the computing device 200 or an input from another computing entity. The reference data 218 may include acceptance information logs 220 comprising acceptance information determined by the computing device 200 in accordance with the SDK 208, or acceptance information received from a server entity. The reference data 218 may also include grammars 222 and instruction statistics 224. The instruction statistics 224 may be determined based on comparisons made between instructions determined locally at the computing device 200 and predetermined instructions stored at another computing device. Such instruction statistics 224 may be used by the SDK 208 or other components of the computing device 200 in order to resolve instruction ambiguities (e.g., compare unclear or undefined instructions with predetermined, acceptable instructions bearing similarities to the unclear or undefined instructions). In some examples, instruction statistics 224 may include statistics associated with acceptance information, such as a rate of acceptance of a particular candidate instruction.

The communication link 212 is illustrated as a wired connection; however, wireless connections may also be used. For example, the communication link 212 may be a wired serial bus such as a universal serial bus or a parallel bus. A wired connection may be a proprietary connection as well. The communication link 212 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

Figure 3:
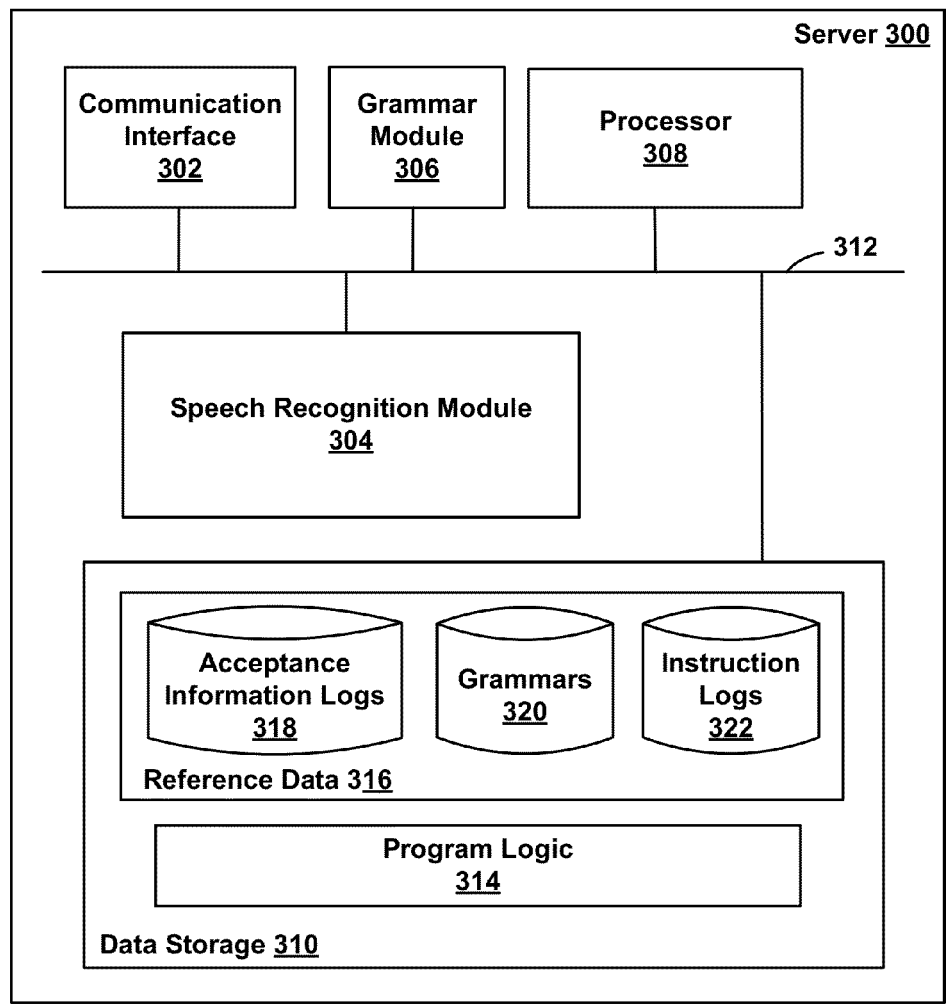
FIG. 3 illustrates a schematic drawing of an example server.

FIG. 3 illustrates a schematic drawing of an example server 300. In some examples, some components illustrated in FIG. 3 may be distributed across multiple servers. However, for the sake of example, the components are shown and described as part of one example server 300.

The server 300 may include a communication interface 302, a speech recognition module 304, a grammar module 306, a processor 308, and data storage 310. All of the components illustrated in FIG. 3 may be linked together by a communication link 312. The server 300 may also include hardware to enable communication within the server 300 and between the server 300 and another computing device, such as the computing device 200 described in FIG. 2. The communication link 312 may be configured similarly to the communication link as described in FIG. 2.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The speech recognition module 304, which may also be referred to as a text recognition module, may be configured to parse a received input (such as a verbal or textual input) and match the received input to a grammar-based textual pattern. Grammars may be produced and/or stored by a grammar module 306. In some examples, the speech recognition module 304 may receive a verbal and/or textual input from a client device (e.g., a mobile phone) in which the input is representative of a voice command (e.g., an instruction) associated with a given voice-enabled application. The voice command may be provided by a user of the client device on which the application is located. The speech recognition module 304 may parse the input and store the resulting instruction, which may be used as a candidate instruction. Further, the stored instruction may be associated with acceptance information. In other examples, speech or text recognition may be performed by a client device. Other examples are also possible.

The data storage 310 may store program logic 314 that can be accessed and executed by the processor 306. The data storage 310 may also store reference data 316 that may serve to assist another device (e.g., the computing device 200 of FIG. 2) with determining an instruction set for a VUI. Similarly to the computing device 200 illustrated in FIG. 2, the reference data 316 may include acceptance information logs 318 and grammars 320. Additionally, the reference data 316 may include instruction logs 322 comprising a plurality of instructions associated with a variety of given applications which may be sent to the computing device 200 (e.g., as candidate instructions). Each candidate instruction may comprise one or more grammars recognizable by a VUI of one or more applications. Further, an instruction may be stored in the instruction logs 322 after being parsed by the speech recognition module 304. The server 300 may be configured to access the reference data 316 upon receiving an input from a client device or other computing device.

In some examples, the server 300 may employ complex machine-learning and natural language processing algorithms (e.g., a part of speech tagger, a syntactic parser, a named entity tagger, etc.) configured to modify grammars 320 and manage acceptance information logs 318 and instruction logs 322. Such machine-learning and natural language processing algorithms may be employed in accordance with the speech recognition module 304 or other components of the server 300.

Figure 4:
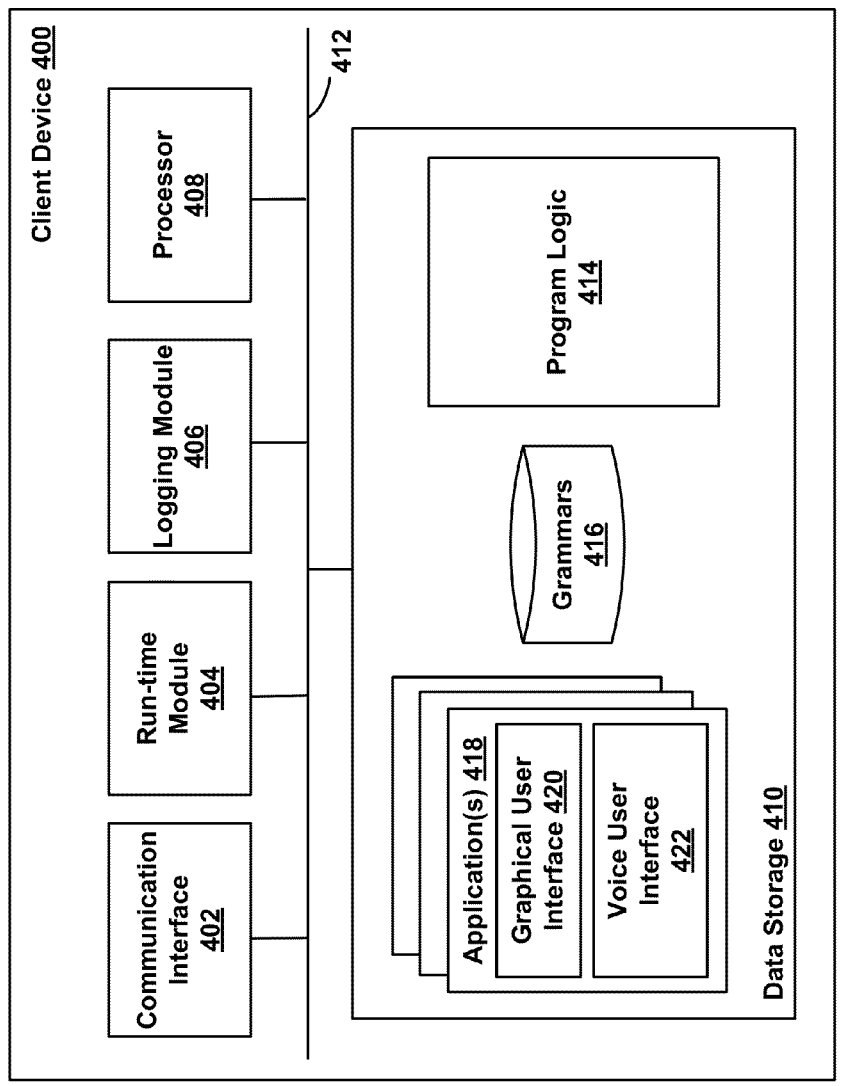
FIG. 4 illustrates a schematic drawing of an example mobile device.

FIG. 4 illustrates a schematic drawing of a mobile device 400. In some examples, some components illustrated in FIG. 4 may be distributed across multiple computing devices. However, for the sake of example, the components are shown and described as part of one example mobile device 400. The mobile device 400 may be a smartphone, laptop computer, email/messaging device, tablet computer, or similar device that may be configured to perform the functions described herein.

The mobile device 400 may include a communication interface 402, a run-time module 404, a logging module 406, a processor 408, and data storage 410. All of the components illustrated in FIG. 4 may be linked together by a communication link 412. The mobile device 400 may also include hardware to enable communication within the mobile device 400 and between the mobile device 400 and one or more other computing devices (not shown). The hardware may include transmitters, receivers, and antennas, for example. The communication link 412 may be configured similarly to the communication link as described in FIGS. 2 and 3.

The communication interface 402 may allow the mobile device 400 to communicate with one or more other computing devices, such as the computing device 200 of FIG. 2 and the server 300 of FIG. 3. Thus, the communication interface 402 may be configured to receive input data from one or more computing devices, and may also be configured to send output data to the one or more computing devices. In some examples, the communication interface 402 may also maintain and manage records of data received and sent by the mobile device 400. In other examples, records of data may be maintained and managed by other components of the mobile device 400.

The run-time module 404 may perform speech/text recognition functions locally at the mobile device 400, similar to the speech recognition module 304 described in FIG. 3. In another example, the run-time module may be configured to receive an instruction (e.g., a textual input) from a separate module configured to convert a verbal input into the textual input. It should be understood that the functions performed by the run-time module 404 may be divided between the mobile device 400 and one or more client devices and/or servers in a particular network. However, strictly client-side and/or purely server-side run-time functions are possible as well. In some examples, the run-time module 404 may utilize one or more grammars and/or grammar-based textual patterns in order to parse an instruction. Further, the run-time module 404 may perform grammar-based/rule-based textual pattern recognition, and/or other forms of speech/text recognition using a variety of techniques, such as by use of finite state machines, algorithms, or other techniques known by those having ordinary skill in the art.

After parsing an instruction, the run-time module 304 may send an output comprising a record of the instruction and the result of the parsing of the instruction to the logging module 406 configured to store the output received from the run-time module 404. The logging module 406 may also be configured to store one or more portions of the instruction, including any portion that may not have been successfully parsed. In some examples, the logging module 406 may store data locally at the mobile device 400. In other examples, the logging module 406 may store data remotely at another computing device, such as the server 300 of FIG. 3. The logging module 406 may then send data to the server 300 to be processed so as to store parsed instructions and/or update grammars associated with the instruction. Modifications may often be made to an incorrect grammar when an unsuccessful parsing occurs due to the incorrect grammar.

It should be understood, however, that instructions may be parsed without utilization of grammars, or stored without parsing. Further, instructions may be parsed without utilization of grammars. Still further, an instruction set for a VUI may be determined without the involvement of grammars.

The data storage 410 may store program logic 414 that can be accessed and executed by the processor 408, and grammars 316 utilized by the run-time module 304. The data storage 410 may also store one or more applications 418 executable by the processor 408. The applications 418 may be configured to perform a plurality of functions (also referred to herein as "actions") based on an input from a user of the mobile device 400. An application 418 may include a graphical user interface (GUI) 420 with which a user may provide non-verbal inputs, such as textual inputs/instructions, to the application 418. An application 418 may also include a VUI 422 configured to recognize a set of verbal instructions comprising natural language.

In some examples, the GUI 420 and the VUI 422 of an application 418 may be configured to receive similar instructions and thus perform one or more functions based on the received instructions. In other examples, the GUI 420 and the VUI 422 of an application 418 may be configured to receive different instructions, in which case certain functions may be performed upon receiving text-based instructions and other functions may be performed upon receiving voice-based instructions.

An application 418 may be configured to perform a given action in response to receiving a plurality of varying acceptable instructions. In other words, a given action may be associated with a plurality of instructions in which each instruction of the plurality is at least partially similar to at least one other instruction of the plurality. For example, a navigation-based application may include an action to locate a city on a map, and a variety of similar text/voice instructions may be associated with the LOCATE action, such as "find New York City," "please locate New York City," and the like.

Figure 5:
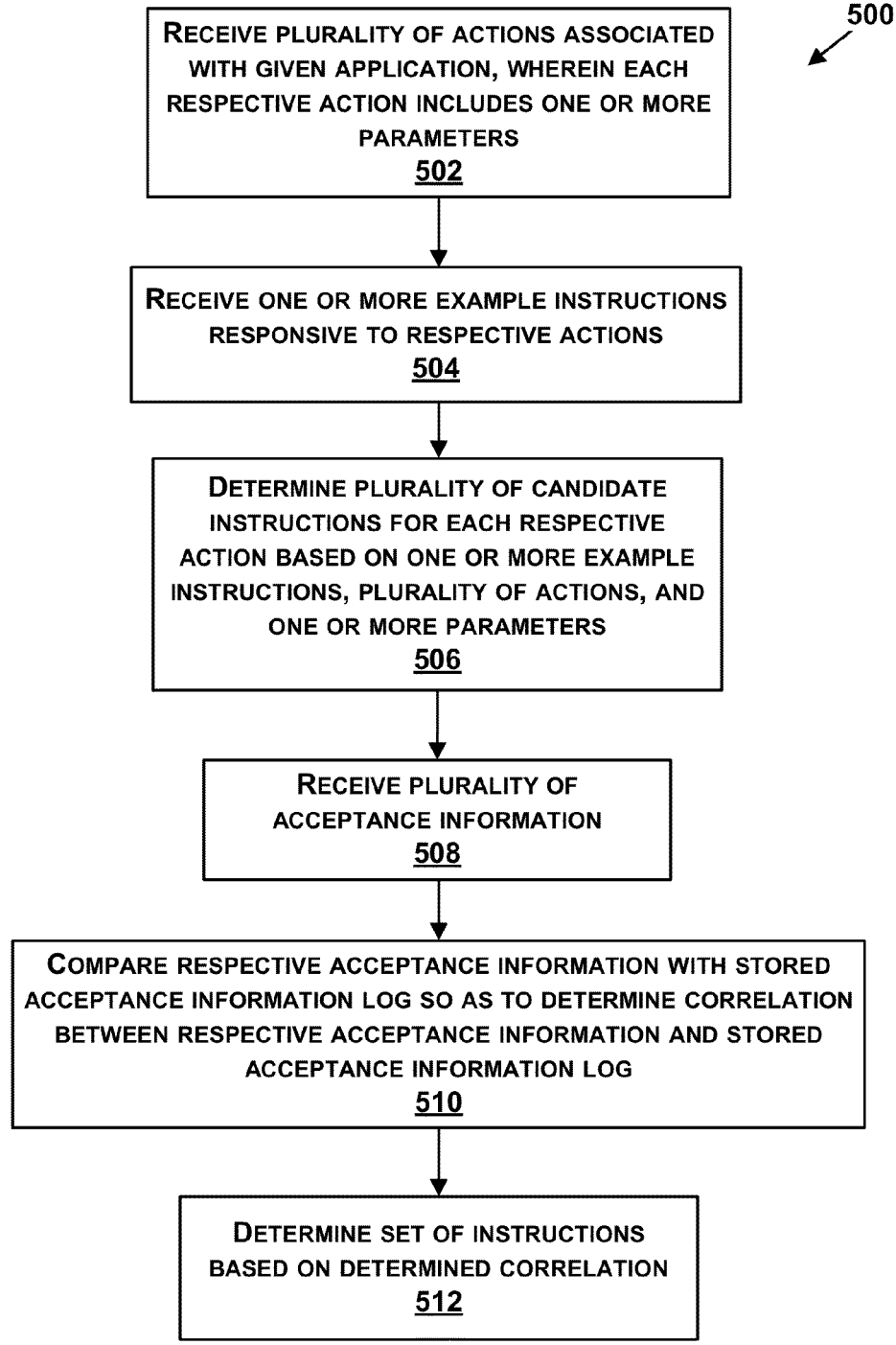
FIG. 5 depicts a flow chart of an example method.

FIG. 5 depicts a flow chart of an example method 500. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 500 shown in FIG. 5 will be described as implemented by an example computing device, such as the computing device 200 illustrated in FIG. 2. It should be understood that other entities can implement one or more steps of the example method 500.

Initially, at block 502, the method 500 includes receiving information indicating a plurality of actions associated with a given application. Each respective action of the plurality of actions may include one or more parameters. The computing device may receive the plurality of actions and parameters from an application developer in order to build a VUI of the given application. For example, in developing a movie theater application, the developer may provide one or more actions that the application may be configured to perform, such as searching for a specific movie theater based on one or more criteria (e.g. SEARCH) or buying tickets to a particular movie at the specific movie theater (e.g., BUY). The BUY action, in particular, may include parameters such as "theater name," "date," "time," and "number of tickets." Further, each respective parameter may include at least one argument associated with the respective parameter. The "number of tickets" parameter, in particular, may include arguments (e.g., values) such as "1," 2," "3," and so on. Still further, an argument such as "2" may be expressed as a variety of alpha-numeric text strings, such as "two," "2 tickets," "two tickets," etc. In some examples, such varying alpha-numeric text string expressions may function as entities separate from arguments (e.g., "2" may be an argument and "two tickets" may be a sub-argument).

Each action, parameter, argument, and the like may be provided by a developer to the computing device in text format (e.g., via a keyboard interface), in voice format (e.g., via a voice-enabled interface in accordance with speech-to-text recognition), or other formats. In general, each combination of parameters and arguments provided by the developer may represent one or more utterances that may be spoken by a user of a given application in order to cause the application to perform an action (e.g., one user may say "buy two tickets for the eight o'clock show of Movie X" and another user may say "two for Movie X at eight o'clock"). In some examples, multiple actions performed by a given application may share similar parameters and arguments.

At block 504, the method 500 includes receiving one or more example instructions responsive to respective actions. In addition to providing actions, parameters, and arguments for a given application, a developer may be prompted by the computing device to provide one or more example instructions comprising natural language. Each example instruction may be associated with a given function that the given application is configured to perform, or a variation of the given function (e.g., searching for one movie theater as opposed to searching for another movie theater). Example instructions responsive to the BUY action may include "buy two tickets for the eight o'clock show of Movie X at Theater A," "one for Movie Y on Thursday night at seven o'clock," and the like. In some examples, because there may exist a large quantity of instructions associated with a given action, the developer may provide example instructions without providing specific arguments/values for the parameters, such as "buy [number of tickets] for [name of movie] at [time]" associated with the BUY action, or "search for [name of theater] with [number of tickets] available for [name of movie]" associated with the SEARCH action. In other examples, the number of parameters included in an instruction may be based on a specificity of a given action (e.g., an instruction such as "buy [number of tickets]" may be provided if the location, time, and movie have previously been determined). In still other examples, instructions may comprise one or more grammars and may be determined using grammar-based textual patterns.

At block 506, the method 500 includes determining a plurality of candidate instructions for each respective action based on the one or more example instructions, the plurality of actions, and the one or more parameters associated with each respective action. Further, each candidate instruction of the plurality of candidate instructions may comprise one or more grammars recognizable by a voice interface for the given application, and the computing device (or components of) may determine candidate instructions using grammar-based textual patterns.

The computing device may determine the candidate instructions for each respective action by comparing the plurality of actions with stored instruction logs (and stored actions associated with each stored instruction in the logs). Further, the candidate instructions may also be determined by comparing the example instructions and/or the parameters with the stored instruction logs. The stored instruction logs may be stored locally at the computing device or remotely at another device that the computing device is in communication with, such as the server 300 described in FIG. 3. The instruction logs may include a plurality of predetermined instructions associated with VUIs for previously developed applications.

The comparing may include the computing device searching for similarities between the provided actions/instructions/parameters and the instruction logs. For example, instructions associated with an in-development movie theater application may be compared with instructions associated with one or more previously developed movie theater applications. If similarities are identified between the instructions, actions, and/or parameters of the in-development application and the predetermined instructions, actions, and/or parameters of the one or more previously developed applications, the predetermined instructions, actions, and/or parameters may be used to determine one or more candidate instructions. In another example, two movie theater applications may share the same SEARCH action and associated parameters. Therefore, one or more predetermined instructions associated with the SEARCH action of a previously developed movie theater application may be used as candidate instructions for the in-development movie theater application.

In some examples, the determined candidate instructions may include one or more modified versions of the example instructions provided to the computing device. The modifications made to the example instructions may be based on comparisons made between the example instructions and the stored instruction logs. In other examples, the determined candidate instructions may include unmodified example instructions (e.g., an example instruction may be provided as a candidate instruction if no match is found between the example instruction and the stored instruction logs).

In some examples, candidate instructions may be determined without the computing device accessing the stored instruction logs, and may thus be determined by other methods, such as by parsing an XML component of a given application. A parser component of the computing device may create an XML markup of the given application, identify actions, parameters, and arguments associated with the given application, and determine one or more candidate instructions based on the parsing. Further, a parser of the computing device may access stored instruction logs (e.g., stored at a server) so as to compare determined instructions, actions, parameters, and arguments with predetermined instructions, actions, parameters, and arguments stored at the server.

At block 508, the method 500 includes receiving a plurality of acceptance information comprising respective acceptance information for each candidate instruction. The plurality of acceptance information may be indicative of whether one or more of the plurality of candidate instructions are applicable to a respective action.

Applicability to a respective action associated with a given application may be determined by a developer of the given application, and thus, the developer may evaluate each candidate instruction and provide the acceptance information for each candidate instruction. Acceptance (or non-acceptance) of a given candidate instruction may be determined by one or more acceptance criteria. In particular, acceptance information associated with the given candidate instruction may include an acceptance of the given candidate instruction (e.g., affirmation of acceptance by the developer), and/or a rejection of the given candidate instruction. In some examples, an acceptance (or rejection) of the given candidate instruction may associate an identifier to the given candidate instruction. The identifier may be indicative of the acceptance or rejection of the given candidate instruction, and may be stored in the instruction logs, the instruction statistics, and/or acceptance information logs at the computing device or at a server, as described in FIGS. 2 and 3.

In addition, acceptance information associated with the given candidate instruction may include a confidence score of the given candidate instruction. For example, the developer may determine a confidence score associated with the given candidate instruction on a numeric scale (e.g., zero to one hundred, with zero representing low confidence), or another type of scale. Acceptance information associated with the given candidate instruction may also include a rank of the given candidate instruction with respect to at least one other candidate instruction associated with the same action as the given candidate instruction. For example, the developer may rank the given candidate instruction higher or lower than another candidate instruction based on applicability to the respective action.

Acceptance information may also be provided outside the process of building a VUI for a given application. For example, a candidate instruction with a high confidence may be included in a set of instructions for a given application, yet in response to receiving the instruction, the given application may not perform the action associated to the instruction or, in some examples, may perform a different action. Therefore, acceptance information of a particular instruction may include an acknowledgement of an action as performed by a given application in response to the instruction. The acknowledgement may include a positive acknowledgement or a negative acknowledgement, and may be based on a user input. For example, if an instruction performs an incorrect action, the user may cancel the incorrect action and/or terminate execution of the given application. Such a response taken by the user may be identified as a negative acknowledgement, associated with the instruction, and stored locally at the mobile device and/or remotely at a server or other entity. Other examples of acceptance information and implementations of acceptance information are also possible.

At block 510, the method 500 includes comparing at least a portion of the respective acceptance information with a stored acceptance information log so as to determine a correlation between the respective acceptance information and the stored acceptance information log. The stored acceptance information log may comprise a plurality of predetermined acceptance information associated with a plurality of predetermined example instructions. In some examples, comparing the respective acceptance information with the stored acceptance information may further comprise comparing one or more portions of the instructions, actions, parameters, and/or arguments associated with the respective acceptance information with that of the stored acceptance information.

One or more correlations may be determined by comparing an acceptance or rejection of a given candidate instruction with one or more previously accepted or rejected instructions (e.g., using an identifier indicative of the acceptance or rejection). For example, a rejected candidate instruction may be validated by a similar (or an identical) predetermined rejected instruction. In another example, a rejected candidate instruction may be determined to be applicable to a given action based on a comparison with one or more similar (or identical) predetermined instructions that were previously identified as accepted, which may result in an ambiguity that may necessitate resolution.

Further, one or more correlations may be determined by comparing a confidence score of a given candidate instruction with the confidence scores of one or more predetermined instructions. For example, a given candidate instruction with a high confidence score may be validated by comparing the confidence score with lower confidence scores of similar or identical predetermined instructions. In another example, a given candidate instruction with a high confidence score may be identified as inapplicable to a given action based on a comparison with confidence scores of similar or identical predetermined instructions that exceed the high confidence score. Other examples are also possible.

Still further, one or more correlations may be determined by comparing a rank of a given candidate instruction not only with respect to at least one other candidate instruction associated with the same action as the given candidate instruction, but with respect to the ranks of at least one other predetermined instruction with the same action as the given candidate instruction. In one example, a given candidate instruction with a high rank may be validated by comparing the rank with the ranks of similar or identical predetermined instructions. In another example, a given candidate instruction with a high rank may be identified as inapplicable to a given action based on a comparison with ranks of similar or identical predetermined instructions that exceed the high rank of the given candidate instruction.

While validation of applicability may indicate that a given candidate instruction is applicable to a given action, it should be understood that in some examples, candidate instructions or predetermined instructions identified as inapplicable may not indicate that such instructions are not applicable to a given action. Rather, identification of inapplicability may indicate that while the given candidate instruction is applicable to the given action, there may exist a majority of candidate instructions or predetermined instructions that may indicate a degree of applicability higher than that of the given candidate instruction.

A comparison of one portion of acceptance information with that of stored acceptance information log may result in an ambiguity and thus the one portion may not be used to determine the correlation. For example, a high rank of a given candidate instruction may be equal to the high ranks of one or more predetermined instructions identified as applicable to the same action as the given candidate instruction. In general, to resolve ambiguities, one portion of the acceptance information may be compared with portions of the stored acceptance information log other than the one portion. Additionally or alternatively, one or more grammars associated with the instructions subject to comparison may be used to resolve ambiguities. Statistics associated with the instructions may be used to resolve ambiguities as well, and such statistics may be continuously modified and updated based on an increasing amount of stored instructions associated with developed voice-enabled applications.

After receiving the acceptance information, the computing device may store the acceptance information locally at the computing device and/or remotely at a server. The computing device may also store the results of the comparing in the acceptance information log or in another type of log. Storage of such data may facilitate determination of instruction sets for later-developed application VUIs. In some examples, the acceptance information may be stored with the instructions that the acceptance information is associated with. In other examples, some acceptance information and associated instructions may be segregated in (or permanently removed from) storage based on one or more acceptance identifiers (e.g., grouping instructions with low confidence scores or deleting an instruction with a confidence score of zero). Acceptance information and associated instructions may be managed and organized in other ways as well.

In some examples, one or more stored instruction logs, such as the instruction logs 322 stored at the server 300 in FIG. 3, may include a training set of instructions. The training set of instructions may include instructions predetermined by human input prior to the server receiving any instructions from application developers or other sources. After production of a server begins, the server may be configured to compare received instructions with the training set of instructions so as to build a larger database of stored instruction logs. Stored instruction logs may be maintained by parties other than application developers, and acceptance information associated with the instructions stored in the instruction logs may be provided by other parties as well (e.g., acceptance information provided outside of the voice-enabled development methods described herein). Such parties may also be used to validate instruction statistics determined by a server or other computing device.

At block 512, the method 500 includes determining a set of instructions based on the determined correlation. The set of instructions may include one or more of the determined candidate instructions, and each instruction of the set of instructions may include a text string representative of one or more spoken utterances. The determined correlation may be representative of the applicability of a given candidate instruction as a result of the comparisons made between the acceptance information of the given candidate instruction with the stored acceptance log. However, in some examples, terms such as "applicability" and "acceptance" with respect to a given candidate instruction and/or predetermined instruction described herein may be defined by whether the determined set of instructions includes the given candidate instruction, or similarly whether a predetermined set of instructions included the predetermined instruction. For example, a candidate instruction with an identifier indicative of acceptance of the candidate instruction may not be included in the set of instructions.

In some examples, a given candidate instruction may be added to the set of instructions if the confidence score of the given candidate instruction is threshold high or above a threshold value. A threshold may be predetermined by a developer or by the computing device. In other examples, a given candidate instruction may be added to the set of instructions if the rank of the given candidate instruction is greater than at least one other candidate instruction of the plurality of candidate instructions. In still other examples, a given candidate instruction may be added to the set of instructions based on a combination of one or more portions of the acceptance information associated with the given candidate instruction. Other examples are also possible.

For a given application, the set of instructions may be provided by the computing device to a VUI associated with the given application. The VUI and the set of instructions may be integrated with the given application so as to enable the given application (e.g., via a mobile device) to recognize and process voice commands (e.g., instructions) in order to perform the actions (e.g., functions) that the given application is configured to perform. The computing device may send the set of instructions to a mobile device so as to modify the given application at the mobile device (e.g., update the given application). Alternatively, the computing device may be configured to locally modify the given application/VUI to include the set of instructions. Such modifications may be executed by an SDK.

FIG. 6 illustrates an example system 600, as well as inputs and outputs to the example system, in accordance with an example method. As illustrated, the system 600 may include a computing device 602 and a server 604, each of which may be similar or identical to the computing device 200 and the server 300 illustrated in FIGS. 2 and 3, respectively. In some examples, the system 600 may also include a mobile device (not shown).

The system 600 (or, in some examples, just the computing device 602) may be configured to receive inputs from a developer of a given application. Such inputs may include actions 606, parameters (and associated arguments) 608, example instructions 610, and acceptance information 612. The system 600 may be configured to produce outputs based on the received inputs. Such outputs may include an instruction set 614. The instruction set 614 may comprise a plurality of candidate instructions based on the actions 606, the parameters/arguments 608, the example instructions 610, and the acceptance information 612. It should be understood that the inputs and outputs described in FIG. 6 may be received and sent by one or more entities in the system 600, as well as by components of the one or more entities in the system 600, or by other entities/components not described herein.

Figure 7A:
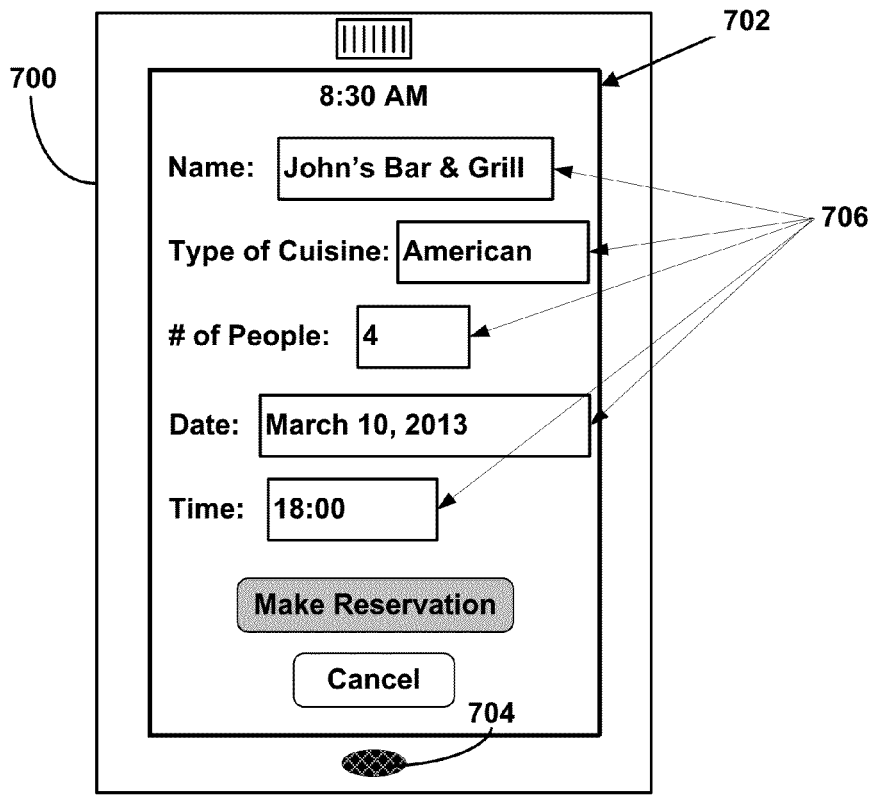
FIGS. 7A-7B illustrate an example mobile device performing functions in accordance with an example method.
Figure 7B:
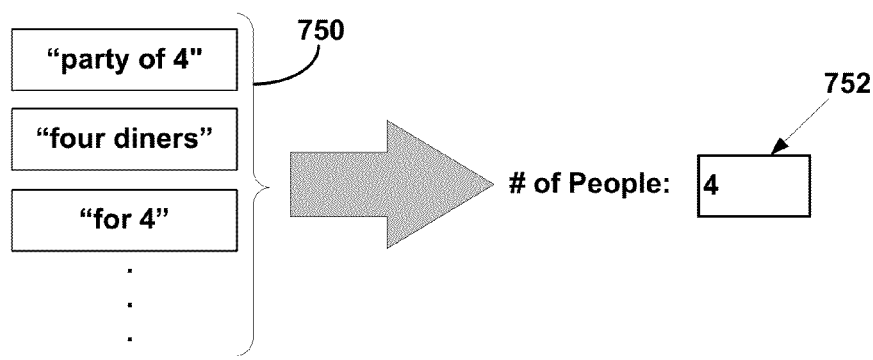

FIGS. 7A-7B illustrate an example mobile device 700 performing functions in accordance with an example method. The mobile device 700 shown may be similar or identical to the mobile device 400 described in FIG. 4, but it should be understood that the computing device may take other forms and/or may include components different than those illustrated in FIG. 7. Regarding FIG. 7A, the mobile device 700 may include a GUI 702 configured to provide an interactive graphical display to a user of the mobile device 700 possibly as part of a software application. Further, the GUI 702 may be configured to receive text-based inputs from the user of the mobile device 700. The mobile device 700 may also include a microphone 704 or other component configured to receive spoken inputs from the user of the mobile device 700. Further, the microphone 704 may be configured to operate in accordance with a VUI of the mobile device 700 and/or a VUI of a given application executable by the mobile device 700.

The GUI 702 may provide a plurality of fields 706 (e.g., parameters) to the user of the mobile device 700. The fields 706 may be associated with a given action to perform. For example, as shown in FIG. 7, a restaurant application may be configured to reserve seating at a restaurant (e.g., a RESERVE action). The RESERVE action may include a plurality of fields/parameters 706 that may be populated based on an instruction provided by the user of the mobile device. The fields 706 may include RESTAURANT NAME, CUISINE TYPE, NUMBER OF PEOPLE, DATE, and TIME. In addition, each field 706 may be populated by arguments associated with each respective field 706 (e.g., "John's Bar & Grill" may be associated with RESTAURANT NAME).

FIG. 7B illustrates a plurality of arguments 750 associated with one of the fields 706, specifically the NUMBER OF PEOPLE field 752. For example, while building the VUI for the restaurant application, a developer may provide the plurality of arguments 750 to a computing device (not shown) for each respective field. The arguments 750 may be representative of a plurality of spoken utterances (or text strings) in natural language that may be included in a given instruction to enable a given action to be performed, such as the RESERVE action. As illustrated, arguments 750 such as "party of 4," "four diners," and "for 4" may each be used to populate the NUMBER OF PEOPLE field 752. In some examples, the arguments 750 may be based on one or more grammars.

FIG. 8 illustrates an example computing device performing functions in accordance with an example method. More specifically, FIG. 8 illustrates a GUI 800 that may be displayed to a developer by a SDK at a computing device so as to enable the developer to provide acceptance information. The GUI 800 shown may include a plurality of determined candidate instructions (e.g., as text strings comprising natural language) based on actions, parameters, arguments, and/or example instructions provided by the developer. Each respective candidate instruction may then be accepted, rejected, ranked, and/or given a confidence score by the developer. For example, for the RESERVE action, the candidate instruction "Make dinner reservation, party of [number], at [time]" includes parameters such as NUMBER OF PEOPLE and TIME.

If a candidate instruction is added to a set of instructions for a given application, portions of the candidate instruction may be recognized by a parser, speech recognition module, or other such component configured to recognize the candidate instruction (e.g., the run-time module 404 of FIG. 4). Portions of the candidate instruction may be recognized as one or more actions to perform and/or parameters associated with the one or more actions. Referring back to the "Make dinner reservation, party of [number], at [time]" candidate instruction, for example, the "make dinner reservation" portion may be associated with the RESERVE action. Further, the "party of [number]" portion may be associated with the NUMBER OF PEOPLE parameter, and the "at [time]" portion may be associated with the TIME parameter.

In some examples, a particular instruction of the set of instructions may not be recognized. Further, while providing acceptance information to the computing device, the developer may determine that the particular candidate instruction may not be recognized, and thus provide negative acceptance information, such as a low confidence score, a low rank, and/or an identifier indicating a rejection of the particular candidate instruction. As shown in FIG. 8, the candidate instruction "Reserve [number] for [time]" may be determined to be inapplicable to the RESERVE action, and the acceptance information associated with the candidate instruction may reflect such a determination.

Figure 9:
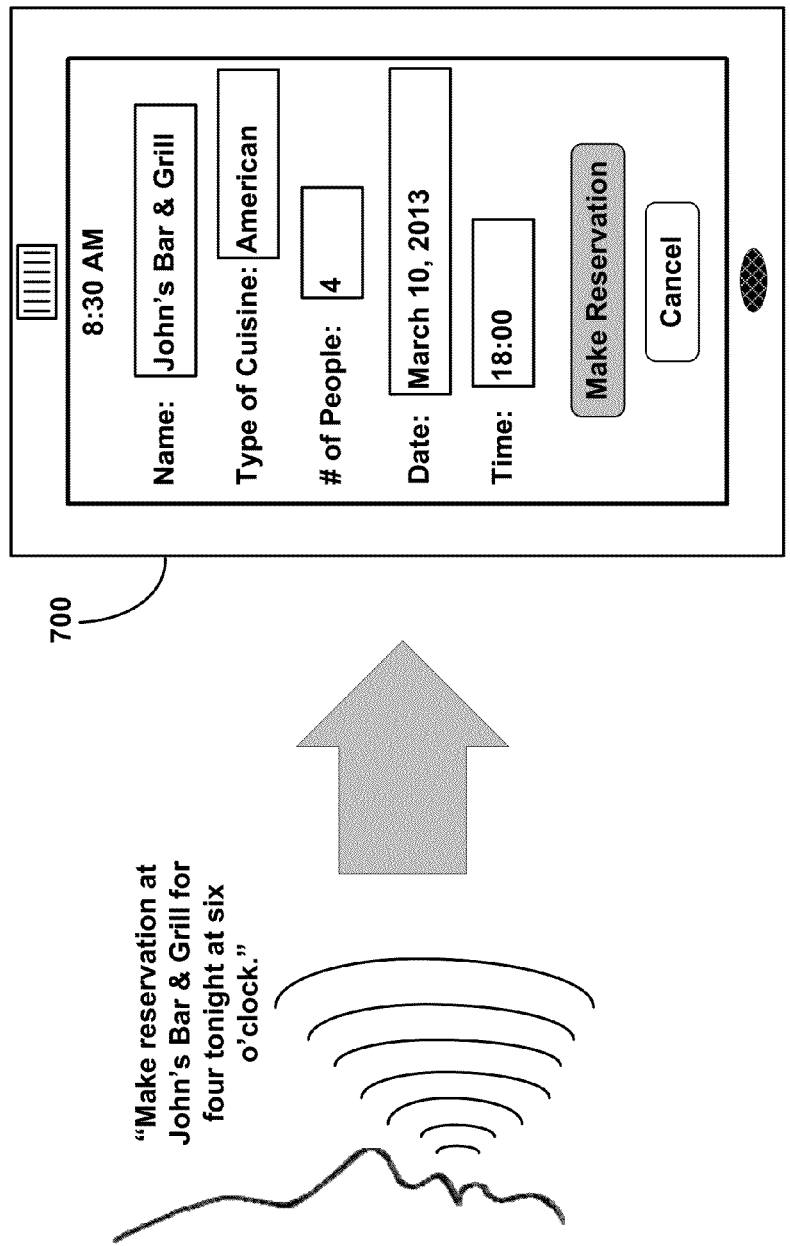
FIG. 9 illustrates an example mobile device performing functions in accordance with an example method.

FIG. 9 illustrates an example mobile device, such as the mobile device 700 of FIG. 7, performing functions in accordance with an example method. Further, FIG. 9 illustrates a user of the mobile device 700 providing a spoken instruction to the mobile device 700. The spoken instruction may be received by the mobile device 700 and converted to a text string representative of one or more utterances of the user.

As illustrated, the spoken instruction, "Make reservation at John's Bar and Grill for four tonight at six o'clock," may be provided to the mobile device 700 executing the restaurant application. Portions of the instruction may be used to identify an action to be performed, such as the portion "Make reservation," which identifies that the restaurant application should provide information regarding a restaurant reservation to the user via the GUI (e.g., the RESERVE action). Other portions of the spoken instruction, such as "John's Bar and Grill," "for four," "tonight," and "six o'clock," may be arguments recognized by the VUI and associated with the RESTAURANT NAME, NUMBER OF PEOPLE, DATE, and TIME parameters, respectively.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

We claim:

1. A method comprising:
    receiving, at a computing device, information indicating a plurality of actions that a given application is configured to perform, wherein the information indicating each respective action of the plurality of actions includes one or more parameters that are used to enable the given application to perform the respective action;
    receiving, at the computing device, for each respective action, one or more example instructions that, when recognized by the given application, causes the given application to perform the respective action, wherein the one or more example instructions comprise natural language;
    based on the one or more example instructions for each respective action, the plurality of actions, and the one or more parameters included for each respective action, the computing device determining a plurality of candidate instructions for each respective action that, when recognized by a voice interface of the given application, causes the given application to perform the respective action, wherein each candidate instruction of the plurality of candidate instructions comprises one or more grammars recognizable by the voice interface of the given application;
    receiving, at the computing device, a plurality of acceptance information comprising, for each candidate instruction, respective acceptance information indicative of whether the candidate instruction is applicable to the respective action, wherein the plurality of acceptance information indicates, for each respective action of at least one of the plurality of actions, that at least one of the plurality of candidate instructions determined for the respective action is rejected;
    based on the plurality of acceptance information, storing, at the computing device, for each candidate instruction, a respective identifier associated with the candidate instruction and indicative of whether the candidate instruction is rejected;
    the computing device comparing at least a portion of the respective acceptance information with a stored acceptance information log so as to determine a correlation between the respective acceptance information and the stored acceptance information log, wherein the stored acceptance information log comprises a plurality of predetermined acceptance information associated with a plurality of predetermined example instructions; and
    based on the correlation, the computing device referring to the stored identifiers to determine a set of instructions that are recognizable by the voice interface and that, when recognized by the voice interface, causes the given application to perform one or more of the plurality of actions, wherein determining the set of instructions comprises, for each respective action, (i) selecting, based on the stored identifiers, one or more of the plurality of candidate instructions for the respective action to be included in the set of instructions and (ii) selecting, based on the stored identifiers, the at least one rejected candidate instruction for the respective action to not be included in the set of instructions and to not be recognizable by the voice interface to cause the given application to perform the respective action.

2. The method of claim 1, further comprising providing the set of instructions to the voice interface of the given application.

3. The method of claim 1, further comprising based on the correlation, the computing device modifying the stored acceptance information log to include at least a portion of the plurality of acceptance information.

4. The method of claim 1, wherein each respective parameter of the one or more parameters includes at least one argument associated with the respective parameter, wherein the at least one argument includes a text string.

5. The method of claim 1, wherein the respective acceptance information includes one or more of: an acceptance of the candidate instruction, a rejection of the candidate instruction, a confidence score of the candidate instruction, and a rank of the candidate instruction with respect to at least one other candidate instruction of the plurality of candidate instructions.

6. The method of claim 1, wherein determining the plurality of candidate instructions for each respective action comprises comparing the plurality of actions with stored instruction logs, wherein the stored instruction logs include a plurality of respective stored actions associated with each respective stored instruction of the stored instruction logs.

7. The method of claim 6, wherein the determined plurality of candidate instructions is based at least in part on a match of one or more portions of the plurality of actions to one or more portions of the stored instruction logs.

8. The method of claim 6, wherein determining the plurality of candidate instructions for each respective action further comprises:
matching at least a portion of the respective action to one or more grammars; and
determining a modification to the respective action based at least in part on the matching.

9. The method of claim 1, further comprising:
before determining the plurality of candidate instructions for each respective action, determining, by the computing device, markup language data representative of the given application, wherein the markup language data includes identifiers of the plurality of actions and the one or more parameters; and
the computing device parsing the markup language data to determine, based on the identifiers, the plurality of actions and the one or more parameters, and to further determine information indicating a plurality of input values for the one or more parameters.

10. The method of claim 9, wherein determining the plurality of actions and the information indicating the plurality of input values for the one or more parameters comprises comparing each respective action with stored actions so as to determine a correlation between the respective action and the stored actions, wherein each stored action includes one or more stored parameters associated with the stored action.

11. A non-transitory computer readable storage medium having stored thereon instructions, that when executed by a computing device, cause the computing device to perform functions comprising:
receiving information indicating a plurality of actions that a given application is configured to perform, wherein the information indicating each respective action of the plurality of actions includes one or more parameters that are used to enable the given application to perform the respective action;
receiving, for each respective action, one or more example instructions that, when recognized by the given application, causes the given application to perform the respective action, wherein the one or more example instructions comprise natural language;
based on the one or more example instructions for each respective action, the plurality of actions, and the one or more parameters included for each respective action, determining a plurality of candidate instructions for each respective action that, when recognized by a voice interface of the given application, causes the given application to perform the respective action, wherein each candidate instruction of the plurality of candidate instructions comprises one or more grammars recognizable by the voice interface of the given application;
receiving a plurality of acceptance information comprising, for each candidate instruction, respective acceptance information indicative of whether the candidate instruction is applicable to the respective action, wherein the plurality of acceptance information indicates, for each respective action of at least one of the plurality of actions, that at least one of the plurality of candidate instructions determined for the respective action is rejected;
based on the plurality of acceptance information, storing, at the computing device, for each candidate instruction, a respective identifier associated with the candidate instruction and indicative of whether the candidate instruction is rejected;
comparing at least a portion of the respective acceptance information with a stored acceptance information log so as to determine a correlation between the respective acceptance information and the stored acceptance information log, wherein the stored acceptance information log comprises a plurality of predetermined acceptance information associated with a plurality of predetermined example instructions; and
based on the correlation, referring to the stored identifiers to determine a set of instructions that are recognizable by the voice interface and that, when recognized by the voice interface, causes the given application to perform one or more of the plurality of actions, wherein determining the set of instructions comprises, for each respective action, (i) selecting, based on the stored identifiers, one or more of the plurality of candidate instructions for the respective action to be included in the set of instructions and (ii) selecting, based on the stored identifiers, the at least one rejected candidate instruction for the respective action to not be included in the set of instructions and to not be recognizable by the voice interface to cause the given application to perform the respective action.

12. The non-transitory computer readable storage medium of claim 11, wherein each instruction of the set of instructions includes a text string representative of one or more spoken utterances.

13. The non-transitory computer readable storage medium of claim 11, wherein the given application includes a graphical interface provided by a mobile device.

14. The non-transitory computer readable storage medium of claim 11, wherein the respective acceptance information includes one or more of: an acceptance of the candidate instruction, a rejection of the candidate instruction, a confidence score of the candidate instruction, and a rank of the candidate instruction with respect to at least one other candidate instruction of the plurality of candidate instructions.

15. The non-transitory computer readable storage medium of claim 14, wherein determining the set of instructions comprises adding the respective candidate instruction to the set of instructions based on the confidence score of the respective candidate instruction being above a threshold.

16. The non-transitory computer readable storage medium of claim 14, wherein determining the set of instructions comprises adding the respective candidate instruction to the set of instructions based on the rank of the candidate instruction is greater than at least one other candidate instruction of the plurality of candidate instructions.

17. A system, comprising:
at least one processor; and
data storage comprising program instructions executable by the at least one processor to perform functions comprising:
receiving information indicating a plurality of actions that a given application is configured to perform, wherein the information indicating each respective action of the plurality of actions includes one or more parameters that are used to enable the given application to perform the respective action;
receiving, for each respective action, one or more example instructions that, when recognized by the given application, causes the given application to perform the respective action, wherein the one or more example instructions comprise natural language;
based on the one or more example instructions for each respective action, the plurality of actions, and the one or more parameters included for each respective action, determining a plurality of candidate instructions for each respective action that, when recognized by a voice interface of the given application, causes the given application to perform the respective action, wherein each candidate instruction of the plurality of candidate instructions comprises one or more grammars recognizable by the voice interface of the given application;

receiving a plurality of acceptance information comprising, for each candidate instruction, respective acceptance information indicative of whether the candidate instruction is applicable to the respective action, wherein the plurality of acceptance information indicates, for each respective action of at least one of the plurality of actions, that at least one of the plurality of candidate instructions determined for the respective action is rejected;

based on the plurality of acceptance information, storing, at the computing device, for each candidate instruction, a respective identifier associated with the candidate instruction and indicative of whether the candidate instruction is rejected;

comparing at least a portion of the respective acceptance information with a stored acceptance information log so as to determine a correlation between the respective acceptance information and the stored acceptance information log, wherein the stored acceptance information log comprises a plurality of predetermined acceptance information associated with a plurality of predetermined example instructions; and based on the correlation, referring to the stored identifiers to determine a set of instructions that are recognizable by the voice interface and that, when recognized by the voice interface, causes the given application to perform one or more of the plurality of actions, wherein determining the set of instructions comprises, for each respective action, (i) selecting, based on the stored identifiers, one or more of the plurality of candidate instructions for the respective action to be included in the set of instructions and (ii) selecting, based on the stored identifiers, the at least one rejected candidate instruction for the respective action to not be included in the set of instructions and to not be recognizable by the voice interface to cause the given application to perform the respective action.

18. The system of claim 17, further comprising program instructions executable by the at least one processor to perform functions comprising providing the set of instructions to the voice interface of the given application.

19. The system of claim 18, further comprising a software development kit configured to modify the given application so as to include the voice interface.

20. The system of claim 17, wherein the given application includes a graphical interface provided by a mobile device.

* * * * *